United States Patent
Joubert et al.

(10) Patent No.: US 6,191,246 B1
(45) Date of Patent: Feb. 20, 2001

(54) ETHYLENE-PENTENE-HEXENE COPOLYMER, PROCESS FOR ITS PREPARATION AND USE FOR THE PRODUCTION OF FILMS

(75) Inventors: Dawid Johannes Joubert, Sasolburg; Ignatius Hendrik Potgieter, Vanderbijlpark; Ioan Tincul, Sasolburg, all of (ZA); Peter Loggenberg, Carol Gables, FL (US)

(73) Assignee: Sasol Technology (Proprietary) Limited, Johannesburg (ZA)

( * ) Notice: Under 35 U.S.C. 154(b), the term of this patent shall be extended for 0 days.

(21) Appl. No.: 08/945,495

(22) PCT Filed: May 31, 1996

(86) PCT No.: PCT/GB96/01294

§ 371 Date: Jan. 12, 1998

§ 102(e) Date: Jan. 12, 1998

(87) PCT Pub. No.: WO96/38485

PCT Pub. Date: Dec. 5, 1996

(30) Foreign Application Priority Data

May 31, 1995 (ZA) ...................................................... 95/4434

(51) Int. Cl.[7] .............................. C08F 210/14; C08K 5/13
(52) U.S. Cl. .................................... 526/348.5; 526/124.3; 526/125.6; 526/348.4; 526/348.6; 526/905; 526/916; 524/128; 524/323; 524/330; 524/333; 524/342; 524/343; 524/348; 524/394; 524/399; 524/400; 524/579
(58) Field of Search .............................. 526/348.5, 348.6, 526/916, 124.3, 348.4, 125.6, 905; 524/128, 323, 394, 579, 330, 333, 342, 343, 348, 399, 400

(56) References Cited

U.S. PATENT DOCUMENTS

| | | | | |
|---|---|---|---|---|
| 2,975,159 | * | 3/1961 | Weinmayr | 526/348.5 X |
| 3,073,809 | * | 1/1963 | Kluiber et al. | 526/348.5 X |
| 4,076,698 | * | 2/1978 | Anderson et al. | 526/348.5 X |
| 4,205,021 | * | 5/1980 | Morita et al. | 526/348.5 X |
| 4,405,774 | * | 9/1983 | Miwa et al. | 526/348.5 X |
| 4,530,983 | * | 7/1985 | Matsuura et al. | 526/348.5 X |

FOREIGN PATENT DOCUMENTS

| | | |
|---|---|---|
| 0010428 | 4/1980 | (EP) . |
| 0021605 | 1/1981 | (EP) . |
| 0374783 | 6/1990 | (EP) . |
| 0444606 | 9/1991 | (EP) . |
| 0450304 | 10/1991 | (EP) . |

* cited by examiner

Primary Examiner—Fred Teskin
(74) Attorney, Agent, or Firm—Ladas and Parry

(57) ABSTRACT

The invention provides a polymer which is a polymerization product obtained by polymerizing at least ethylene, 1-pentene and 1-hexene; and a process for producing a polymer by reacting at least ethylene, 1-pentene and 1-hexene in a reaction zone at a pressure between atmospheric and 60 kg/cm$^3$ and at a temperature between 30° C. and 120° C., in the presence of a catalyst system. The invention also provides a polymer composition which comprises a terpolymer of ethylene, 1-pentene and 1-hexene, a phenolic stabilizer component, a metal salt of a higher aliphatic acid, and, optionally, at least one organic phosphite stabilizer.

22 Claims, 1 Drawing Sheet

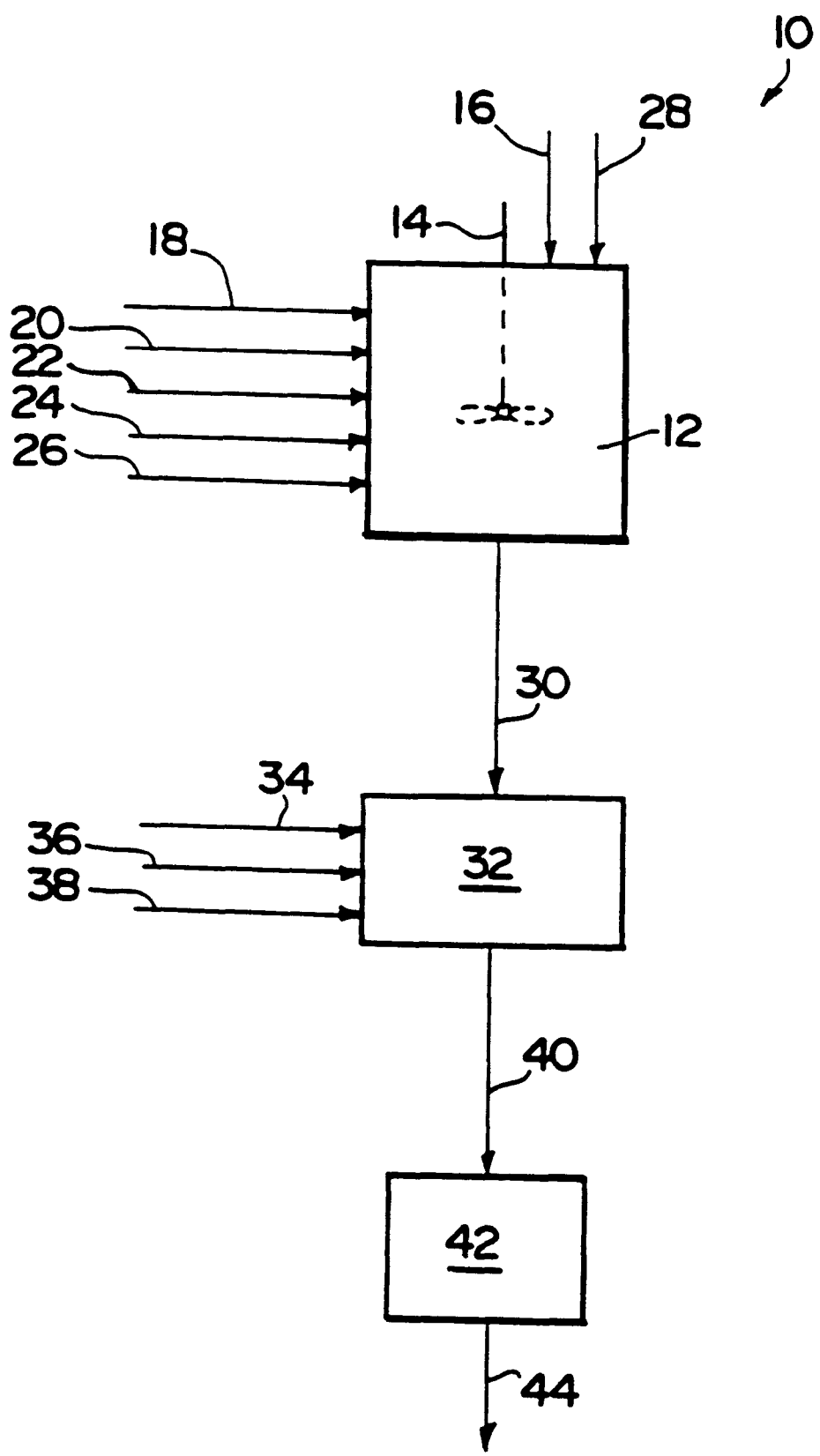

ETHYLENE-PENTENE-HEXENE COPOLYMER, PROCESS FOR ITS PREPARATION AND USE FOR THE PRODUCTION OF FILMS

FIELD OF THE INVENTION

This invention relates to polymerization. It relates in particular to a polymer, and to a process for producing such a polymer.

SUMMARY OF THE INVENTION

According to a first aspect of the invention, there is provided a polymer which comprises a polymerization product obtained by polymerizing at least ethylene, 1-pentene and 1-hexene.

In other words, in accordance with the first aspect of the invention, there is provided a polymer of at least ethylene, 1-pentene and 1-hexene.

In particular, the polymerization product or polymer may be a terpolymer of ethylene, 1-pentene and 1-hexene.

Thus, according to a second aspect of the invention, there is provided a terpolymer of ethylene, 1-pentene and 1-hexene.

The Applicant has found that, generally, such terpolymers exhibit good properties when moulded into film. These properties are controlled mainly by the relative proportions of ethylene, 1-pentene and 1-hexene in the terpolymer.

The molar ratio of ethylene to the sum of n-pentene-1 and n-hexene-1 in the terpolymer may be between 99.9:0.1 and 90.0:10.0, while the molar ratio of 1-pentene to 1-hexene therein may be between 0.1:99.9 and 99.9:0.1.

The terpolymer may have a melt flow rate, as measured according to ASTM D 1238, in the range of about 0.01 to about 100 g/10 min.

The terpolymer may have a density, as measured according to ASTM D 1505, in the range of about 0.89 to about 0.95 g/cm$^3$.

In a first embodiment of the invention, the terpolymer may, when it is bottom blown into a film having a thickness of 30 microns on a 31.77 mm extruder with 220° C. melt temperature using a 2:1 blow ratio, comply with the following requisites:

(a) a melt flow index, as measured according to ASTM D 1238, of 0.01 to 100 g/10 minutes;

(b) a density, as measured according to ASTM D 1505, of 0.890 to 0.950 g/cm$^3$;

(c) an impact strength, as measured according to ASTM D 1709, of greater than 60 g;

(d) a tear strength, as measured according to ASTM D 1922, of greater than 3.0 g/$\mu$m in the machine direction (MD) and greater than 12 g/$\mu$m in the transverse direction (TD); and (e) contains units derived from 1-pentene and 1-hexene between 0.1 and 10 molar % as determined by $^{13}$C NMR (samples dissolved in 1.2 dichlorobenzene).

Such a polymer thus has superior impact strength and good tear properties when blown into a film.

In a second embodiment of the invention, the terpolymer may, when it is bottom blown into a film having a thickness of 30 microns on a 31.77 mm extruder with 220° C. melt temperature using a 2:1 blow ratio, comply with the following requisites:

(a) a melt flow index, as measured according to ASTM D 1238, of 0.01 to 100 g/10 minutes;

(b) a density, as measured according to ASTM D 1505, of 0.890 to 0.950 g/cm$^3$;

(c) an impact strength, as measured according to ASTM D 1709, of greater than 50 g;

(d) a tensile strength at break, as measured according to ASTM D 882, of greater than 25 MPa in the machine direction (MD) and greater than 25 MPa in the transverse direction (TD); and (e) contains units derived from 1-pentene and 1-hexene between 0.1 and 10 molar % as determined by $^{13}$C NMR (samples dissolved in 1,2dichlorobenzene).

Such a polymer thus has superior impact strength and good tensile strength at break when blown into a film.

In a third embodiment of the invention, the terpolymer may, when it is bottom blown into a film having a thickness of 30 microns on a 31.77 mm extruder with 220° C. melt temperature using a 2:1 blow ratio, comply with the following requisites:

(a) a melt flow index, as measured according to ASTM D 1238, of 0.01 to 100 g/10 minutes;

(b) a density, as measured according to ASTM D 1505, of 0.890 to 0.950 g/cm$^3$;

(c) an impact strength, as measured according to ASTM D 1709, of greater than 40 g;

(d) a tensile strength at yield, as measured according to ASTM D 882, of greater than 15 MPa in the machine direction (MD) and greater than 14 MPa in the transverse direction (TD); and (e) contains units derived from 1-pentene and 1-hexene between 0.1 and 10 molar % as determined by $^{13}$C NMR (samples dissolved in 1,2dichlorobenzene).

Such a polymer thus has good impact strength and good tensile strength at yield when blown into a film.

In a fourth embodiment of the invention, the terpolymer may, when it is injection moulded according to ASTM D 647, comply with the following requisites:

(a) a melt flow index, as measured according to ASTM D 1238, of 0.01 to 100 g/10 minutes;

(b) a density, as measured according to ASTM D 1505, of 0.890 to 0.950 g/cm$^3$;

(c) an Izod notched impact strength, as measured according to ASTM D 256, of between 5 and 60 kJ/m$^2$;

(d) a tensile strength at yield, as measured according to ASTM 638 M, of between 10 MPa and 25 MPa;and (e) contains units derived from 1-pentene and 1-hexene between 0.1 and 10 molar % as determined by $^{13}$C NMR (samples dissolved in 1,2dichlorobenzene).

Such a polymer thus has a good balance of impact strength and tensile strength at yield, when injection moulded.

More particularly, the terpolymer may be that obtained by reacting ethylene, 1-pentene and 1-hexene in at least one reaction zone, while maintaining the reaction zone at a pressure in the range between atmospheric pressure and 60 kg/cm$^2$, and at a temperature between 30° C. and 120° C. in the presence of a catalyst or catalyst system.

Thus, according to a third aspect of the invention, there is provided a process for producing a polymer, which process comprises reacting at least ethylene, 1-pentene and 1-hexene in at least one reaction zone, while maintaining the reaction zone at a pressure between atmospheric pressure and 60 kg/cm$^2$, and at a temperature between 30° C. and 120° C., in the presence of a catalyst system, thereby to produce a polymerized product.

The polymerized product or polymer may, as mentioned hereinbefore, be a terpolymer of said ethylene, 1-pentene and 1-hexene.

The polymerization reaction may be effected in a slurry phase. The polymerization reaction may be performed in a substantially oxygen and water free state or atmosphere, and may be effected in the presence or absence of an inert saturated hydrocarbon.

A slurrying agent or solvent is thus required, and may be an inert saturated hydrocarbon. Preferred saturated hydrocarbons suitable for use as slurrying agents or solvents are aliphatic or cyclo-aliphatic liquid hydrocarbons, such as hexane and heptane.

While the reaction temperature can be in the range of 30° C. to 120° C. as stated hereinbefore, it is preferably in the range of 50° C. to 100° C. and most preferably in the range of 60° C. to 90° C.

While the pressure can be in the range of atmospheric pressure to 60 kg/cm$^2$ as stated hereinbefore, it is preferably in the range 3 kg/cm$^2$ to 30 kg/cm$^2$, still more preferably in the range 4 kg/cm$^2$ to 18 kg/cm$^2$.

The catalyst or catalyst system may be a Ziegler-Natta based catalyst or catalyst system. Any suitable Ziegler-Natta catalyst or catalyst system for ethylene polymerization can, at least in principle, be used. A catalyst system comprising a titanium based Ziegler-Natta catalyst, and, as co-catalyst, an aluminium compound is preferred. The most preferred is a titanium-magnesium chloride supported Ziegler-Natta catalyst having a productivity of at least 25 kg polymer/gram of catalyst, where the said catalyst has the ability to incorporate at the same time about the same level of 1-pentene and 1-hexene in the polyethylene chain.

In particular, the Ziegler-Natta catalyst may be that obtained by (i) adding dibutyl ether under inert conditions to a suspension of anhydrous magnesium chloride-in an inert saturated hydrocarbon liquid, with the molar ratio of anhydrous magnesium chloride to dibutyl ether being between 0.3:1 and 3:1, preferably between 1:1 and 2:1, and stirring the resultant mixture for a period of 30 minutes to 10 hours, preferably from 4 to 6 hours, at room temperature;

(ii) adding triethylaluminium dropwise to the suspension, with the molar ratio of triethylaluminium to anhydrous magnesium chloride being between 1:1 and 6:1, preferably between 4:1 and 6:1, to form an activated support-containing slurry;

(iii) adding to the activated support-containing slurry an alcohol, with the molar ratio of the alcohol to the initial magnesium chloride being between 0.4:1 and 4:1, preferably between 0.8:1 and 2.5:1;

(iv) stirring the alcohol/activated support mixture for between 1 and 10 hours, preferably for between 2 and 4 hours; and (v) adding titanium chloride to the alcohol/activated support mixture such that the molar ratio of titanium chloride to magnesium chloride initially used is between 2:1 and 20:1, preferably about 10:1, to form a magnesium chloride supported titanium catalyst.

Magnesium chloride is thus used as a support in this catalyst. The magnesium chloride is used in a form of anhydrous magnesium chloride having a maximum water content of 1.5 %. Magnesium chloride with a water content below 1.5% is commercially available. However anhydrous magnesium chloride can be obtained from MgCl$_2$.6H$_2$O by known methods of anhydrization.

The activation of the anhydrous magnesium chloride is thus performed under inert conditions, ie in a substantially oxygen and water free atmosphere and in the presence of the inert saturated hydrocarbon. Preferred inert hydrocarbon liquids are aliphatic or cyclo-aliphatic liquid hydrocarbons, and the most preferred are hexane and heptane.

The activated support obtained in step (ii) is preferably washed with an inert hydrocarbon liquid, eg hexane, before adding the alcohol thereto.

The alcohol may be selected from the alcohol range having from 2 to 6 Carbon atoms. The alcohol may be used alone, in a dicomponent mixture, or in a three component mixture. A three component mixture of alcohols is preferred. The most preferred method is to select the three alcohols having the same number of carbon atoms as the monomers used in the polymerization. Examples of most preferred alcohol mixtures are ethanol and 1-pentanol; ethanol and hexanol; and ethanol, hexanol and pentanol.

In a dicomponent alcohol mixture, the most preferred molar ratio between the two alcohols is 1:1. In a three component alcohol mixture, the preferred molar ratio is 1:1:1.

After adding the titanium chloride (TiCl$_4$), the mixture or suspension may be stirred under ref lux, and allowed to cool, eg for 24 hours. The resultant catalyst-containing slurry can then be thoroughly washed with an inert hydrocarbon liquid, eg hexane.

The cocatalyst may be an organo aluminium compound. The organo aluminium compound may be expressed by the formula AlR$_m$X$_{3-m}$ wherein R is a hydrocarbon radical or component of 1 to 15 Carbon atoms, X is a halogen atom, and m is a number represented by 0<m<3. Specific examples of suitable organo aluminium compounds which can be used are a trialkyl aluminium, a trialkenyl aluminium, a partially halogenated alkyl aluminium, an alkyl aluminium sesquihalide, and an alkyl aluminium dihalide. Preferred organo aluminium compounds are alkyl aluminium ones and the most preferred is triethylaluminium.

The atomic ratio of aluminium to titanium in the catalyst system may be between 0.1:1 and 500:1, preferably between 1:1 and 100:1.

The reaction is thus carried out in one or more reaction zones, in a single stage reactor vessel or a chain of two or more reaction vessels.

The reaction can be effected in a batch fashion. The 1-pentene and 1-hexene may then be added simultaneously at the start of the reaction, the ethylene added continuously during the course of the reaction, and no product being removed during the course of the reaction. Instead the reaction can be effected in a batch fashion, with the 1-pentene and 1-hexene being added simultaneously with ethylene and continuously or discontinuously during the course of the reaction and no product being removed during the course of the reaction. A still further alternative, when the reaction is effected in a batch fashion, is to add either 1-pentene-1 or 1-hexene at the start of the reaction and to add ethylene continuously during the reaction and then supplying continuously or discontinuously the monomer which was not added at the beginning of the reaction, with no product being removed during the course of the reaction.

The reaction may, however, instead be effected in a continuous manner with the ethylene being added continuously and 1-pentene and 1-hexene being added together or separately, continuously or discontinuously, during the course of the reaction. In this case the product is removed continuously from the reaction vessel.

The terpolymers obtained from a particular feed composition and a particular set of reaction conditions have a random distribution which is determined mainly by the different reactivities of the monomers. This provide a unique tool for obtaining a large variety of ethylene, 1-pentene and 1-hexene terpolymers whose properties are mainly controlled by their composition and non-uniformity.

The molecular weight of the resultant random terpolymer can be regulated by adding hydrogen to the reaction zone. The greater the amount of hydrogen added, the lower will be the molecular weight of the random terpolymer.

The density of the resultant random terpolymer can be regulated by the total content of 1-hexene and 1-pentene. The greater the amount of the sum of 1-pentene and 1-hexene incorporated in the terpolymer the lower is its density.

The Applicant is aware that terpolymers with 1-pentene and 1-hexene are sensitive to oxidation and cannot normally be used without adequate stabilization. The decrease of crystallinity of the copolymer with the increase of the comonomer content, increases the oxygen absorption of the copolymer and consequently its thermooxidative degradation.

Thus, according to a fourth aspect of the invention, there is provided a polymer composition, which comprises (i) a terpolymer of ethylene, 1-pentene and 1-hexene;
(ii) a phenolic stabilizer component;
(iii) optionally, at least one organic phosphite stabilizer; and
(iv) a metal salt of a higher aliphatic acid.

Such a composition shows acceptable thermo-oxidative degradation, and has good long term heat stabilization.

The terpolymer may, in particular, be as hereinbefore described.

The phenolic stabilizer component may comprise a phenolic stabilizer with a molecular mass higher than 300 and/or a monomeric phenolic stabilizer. More particularly the phenolic stabilizer may be a mixture of the phenolic stabilizer with a molecular mass higher than 300 and the monomeric phenolic stabilizer.

The phenolic stabilizer component may comprise at least one alkylphenol; hydroxyphenylpropionate; hydroxybenzyl compound; or alkylidene bisphenol. More particularly, the phenolic stabilizer component may comprise a phenolic antioxidant having molecular mass greater than 300, and may be selected from the group consisting in tetrakis methylene (3,5-di-t-butyl-4-hydroxy hydrocinnamate) methane; octadecyl-3-(3',5'-di-t-butyl-4'-hydroxyphenyl) propionate, 1,3,5-Tris(3'-5'-di-t-butyl-4'hydroxybenzyl)-s-triazine-2,4, 6-(1H,3H,5H)trione, and 2,2'Thiodiethyl bis-(3,5-di-t-butyl-4-hydroxyphenyl)-propionate.

Monomeric phenolic stabilizer antioxidants are dual functional compounds having an antioxidant function and a polymerizable group. They can be incorporated in the polymer by physical methods ie melt mixing the polymer with the monomeric antioxidant or as the homopolymer of the monomeric antioxidant. They can be also incorporated by copolymerization. The preferred method of incorporation of the monomeric antioxidant is graft copolymerization initiated by radical initiators and or mechanical shearing in the molten state. Preferred radical initiators are peroxides. The most preferred peroxide is dicumyl peroxide.

The phenolic monomeric stabilizers have a hindered phenolic group providing the antioxidant function and a polymerizable group.

Preferred phenolic monomeric stabilizers are those having the 3,5-bis(1,1-dimethylethyl)-4-hydroxyphenyl group as the antioxidant function attached to a vinyl polymerizable group.

The monomeric phenolic stabilizer may be selected from the group consisting in 2,6-bis(1,1-dimethylethyl)-4-(1-methylethenyl)phenol, 2,6-bis(1,1-dimethylethyl)-4-(4-pentenyl)phenol, 2,6-bis(1,1-dimethylethyl)-4-(3,3-dimethyl-1-butenyl)phenol, and 2,6-bis(1,1-dimethylethyl)-4-(2-propenyl)phenol. The most preferred phenolic monomeric stabilizer is 2,6-bis(1,1-dimethylethyl)-4-(ethenyl)-phenol.

The use of a phenolic monomeric stabilizer grafted on the copolymer chain inhibits the loss of the antioxidant during processing by volatility, migration or extraction with solvents.

The use of a mixture of the phenolic stabilizer with the phenolic monomeric stabilizer grafted onto the copolymer is a combination which has superior short and long term stabilization effects.

The organic phosphite stabilizer may thus be present in some embodiments of the invention. Preferred organic phosphite stabilizers are those with a molecular mass greater than 300. The organic phosphite stabilizer may be selected from the group consisting in tris(2,4-di-t-butylphenyl)phosphite, tris(4-nonylphenyl)phosphite, tetrakis (2,4-di-t-butylphenyl) -4,4'-diphenylenebis-phosphonite, and bis(2,4-di-t-butylphenyl)pentaerythritol-diphosphite.

The use of an organic phosphite together with a phenolic antioxidant and especially with a mixture of a phenolic antioxidant and a monomeric phenolic antioxidant grafted onto the copolymer chain increases the stability of the propylene/pentene-1 Copolymer towards thermooxidative degradation and provides good long term heat stability.

The metal salt of the higher aliphatic acid may comprise an alkaline earth metal salt such as a magnesium salt, a calcium salt or a barium salt; an alkali metal salt; a zinc salt; cadmium salt; or a lead salt of a higher aliphatic acid such as stearic acid, lauric acid, capric acid, or palmitic acid. The preferred metal salt is calcium stearate.

When a higher aliphatic acid metal salt is added to an ethylene/1-pentene/1-hexene copolymer or an ethylene/1-pentene/1-hexene copolymer composition obtained according to this invention, the metal salt is capable of sufficiently absorbing residual chlorine originating from the catalyst used to produce such a copolymer.

The polymer composition may thus, in one embodiment of the invention, comprise (i) the ethylene/1-pentene/1-hexene terpolymer, in an amount of 100 parts by mass;
(ii) the phenolic stabilizer component in an amount of 0.0005 to 0.1 parts by mass, preferably 0.001 to 0.05 parts by mass; and
(iii) the higher aliphatic metal salt in an amount from 0.005 to 1 parts by mass, preferably from 0.01 to 0.5 parts by mass.

In another embodiment of the invention, the polymer composition may comprise (i) the ethylene/1-pentene/1-hexene terpolymer in an amount of 100 parts by mass;
(ii) the phenolic stabilizer component of 0.0005 to 0.1 parts by mass, preferably 0.001 to 0.05 parts by mass;
(iii) the organic phosphite stabilizer in an amount of 0.001 to 0.5 parts by mass, preferably 0.005 to 0.2 parts by mass; and
(iv) the higher aliphatic metal salt in an amount from 0.005 to 3 parts by mass, preferably 0.01 to 1 parts by mass.

Additionally, other antioxidants, light stabilizers, antistatic agents, antiblocking agents, slip agents, nucleating agents, inorganic and organic fillers, inorganic and organic pigments may be blended with the above mentioned ethylene/1-pentene/1-hexene copolymers and used together with the above mentioned compositions.

BRIEF DESCRIPTION OF THE DRAWING

The invention will now be described by way of the following non-limiting examples and with reference to the accompanying drawing. In the drawing, the single FIGURE shows a simplified flow diagram of a process for producing a terpolymer, according to the invention.

DETAILED DESCRIPTION

In the drawing, reference numeral 10 generally indicates a process for producing a terpolymer, according to the invention.

The process 10 includes a polymerization or reaction vessel 12, providing a reaction zone, and fitted with an agitator 14 in the form of a rotational stirrer. A nitrogen purge line 16 leads into the vessel 12, as does a heptane feed line 18. A catalyst feed line 20 also leads into the vessel 12. The vessel 12 is provided with heating means (not shown) for heating the vessel and controlling the temperature.

A hydrogen feed line 22 also leads into the vessel, as does an ethylene feed line 24. A 1-pentene/1-hexene flow line 26 leads into the vessel 12 as does a propanol feed line 28.

A product withdrawal line 30 leads from the vessel 12 to a filtration stage 32 with propanol, methanol and acetone feed lines 34, 36 and 38 respectively, leading into the filtration zone 32. A terpolymer withdrawal line 40 leads into the filtration zone 32 to a dryer 42.

In use, highly purified heptane is introduced into the vessel 12 along the flow line 18. Thereafter the vessel 12 is purged, by means of nitrogen introduced along the flow line 16, whereafter triethylaluminium catalyst, in the form of heptane solution thereof, is introduced along the flow line 20, together with the titanium catalyst. The temperature is set at a predetermined temperature, and the contents stirred with the stirrer 14.

After a predetermined stirring period, hydrogen is introduced along the flow line 22. At the same time, a fixed quantity of ethylene, along the flow line 24, is fed into the vessel 12 at a predetermined flow rate, as is a 1:1 molar mixture of 1-pentene and 1-hexene along the flow line 26. The pressure increases continuously to a predetermined pressure of 15 kg/cm². Eventually the pressure is decreased to the initial pressure by means of reaction.

On all the ethylene and 1-pentene and 1-hexene mix having been fed into the vessel 12, the vessel is depressurized, and the catalyst decomposed with propanol which is fed into the vessel 12 along the flow line 28. The resultant terpolymer is withdrawn along the flow line 30 and filtered in the stage 32, together with repeated washing with propanol, methanol and acetone introduced along the lines 34, 36 and 38 respectively.

Thereafter the terpolymer product is withdrawn along the flow line 40, and dried in the drier 42, before being withdrawn along the flow line 44.

The process 10 was simulated on a laboratory scale in the following examples:

EXAMPLE 1

3000 g of highly purified n-heptane was introduced into a 10 l stainless steel polymerization vessel provided with agitation. After thorough purging of the vessel with nitrogen 100 ml of triethylaluminium (10% solution in heptane), and 1.5 g of W440 Catalyst was introduced. The temperature was set at 77° C. and after 1 hour of stirring, 1800 mg of hydrogen were added. Further a simultaneous supply of 1000 g of ethylene at a constant flow of 8.2 g/min and a 1:1 molar mixture of 1-pentene and 1-hexene at a constant flow of 6.6 g/min were started. The pressure increased continuously to 15 kg/cm², and the reaction was continued until all the ethylene had been fed to the reaction vessel, at which stage the flow of 1-pentene and 1-hexene was interrupted.

In a next step the polymerization vessel was depressurized and the catalyst decomposed with propanol. The resultant terpolymer was then filtered and repeatedly washed with propanol, methanol and acetone. The terpolymer was dried in a vacuum oven at 70° C. for 24 hours. The yield of the terpolymer was 850 g.

A bottom fed blown film of 30 microns was obtained from the terpolymer on a 31.75 mm extruder with 220° C. melt temperature and a take off speed of 4.2 m/min.

The composition of the terpolymer and the measured properties are presented in Table 1.

EXAMPLE 2

The terpolymerization was performed according to the conditions specified in Example 1, except the quantity of the mixture of 1-pentene and 1-hexene added, which was 2000 g, and the said mixture having a composition of 5 parts of 1-hexene to 1 part of 1-pentene. An amount of 0.5 g of the W440 Catalyst was added and the reaction temperature was set at 75° C. The yield of the terpolymer was 885 g.

To the dried terpolymer powder was added 0.02 weight % of tetrakis methylene (3,5-di-t-butyl-4-hydroxy hydrocinnamate) methane, 0.09 weight % tetrakis(2,4-di-t-butylphenyl)-4,4'-diphenylenebisphosphonite, 0.01 weight % of 2.6-bis(1,1-dimethylethyl)-4-(ethenyl)phenol, 0.005 weight % of dicumyl peroxide and 0.15 weight % of calcium stearate. After thorough mixing the mixture was pelletized on a CTM extruder equipped with water bath and cutter with the extruder zones temperatures of 210/240/240/240° C. and a screw speed of 10 rpm. From the pellets a film was blown according to the conditions described in example 1.

The composition of the terpolymer and the measured properties are presented in Table 1.

EXAMPLE 3

The terpolymerization was performed according to the conditions specified in Example 1, except the quantity of the mixture of 1-pentene and 1-hexene added, which was 2000 g, and the said mixture having a composition of 10 parts of 1-pentene to 1 part of 1-hexene. An amount of 0.75 g of the W440 Catalyst was added and the reaction temperature was set at 80° C. An amount of 200 mg of hydrogen was added. The yield of the terpolymer was 880 g.

To the dried terpolymer powder was added 0.02 weight % of tetrakis methylene (3,5-di-t-butyl-4-hydroxy hydrocinnamate) methane, 0.09 weight % tetrakis(2,4-di-t-butylphenyl)-4,4'-diphenylenebisphosphonite, 0.01 weight % of 2,6-bis(1,1-dimethylethyl)-4-(ethenyl)phenol, 0.005 weight % of dicumyl peroxide and 0.15 weight % of calcium stearate. After thorough mixing the mixture was pelletized on a CTM extruder equipped with water bath and cutter with the extruder zones temperatures of 210/240/240/240° C. and a screw speed of 10 rpm. From the pellets a film was blown according to the conditions described in Example 1.

The composition of the terpolymer and the measured properties are presented in Table 1.

TABLE 1

| Example | Total monomer content % | 1-pentene/ 1-hexene ratio molar | MFI g/10 min | Density g/cm³ | Impact strength g | Tear strength MD g/μm | TD |
|---|---|---|---|---|---|---|---|
| 1 | 2.5 | 1.2/1 | 0.56 | 0.9253 | 112 | 3.08 | 19.76 |
| 2 | 2.0 | 0.3/1.7 | 6.8 | 0.9258 | 61 | 4.1 | 16.6 |
| 3 | 2.2 | 10/1 | 0.1 | 0.9240 | 174 | 6.1 | 21.5 |

EXAMPLE 4

Catalyst (A) Preparation

In a 250 ml flask equipped with a reflux condenser and stirring facilities 1 g of anhydrous magnesium chloride are suspended in 60 ml highly purified hexane. Further 1 ml of dibutyl ether was added. After the heat of mixing was dissipated the mixture was stirred for 3 hours. An amount of 5 g of triethyl aluminium was slowly added dropwise to avoid excessive heat build up and the mixture allowed to cool to room temperature under stirring. The slurry is then subjected to twelve hexane washing with 50 ml hexane each time.

To the activated support 1 ml of a 1:1 molar mixture of ethanol with pentanol was added and the slurry was stirred for 3 hours. Further 10 ml of TiCl₄ was added and the mixture stirred under reflux. After cooling down the slurry is washed with hexane 10 times with 50 ml hexane each time. After the final washing the slurry is adjusted to a concentration of 0.01 g catalyst/ml hexane slurry.

EXAMPLE 5

Catalyst (B) Preparation

The catalyst preparation was repeated in the conditions specified in Example 4 except that to the activated support 1 ml of a 1:1 molar mixture of ethanol with hexanol was added instead of the ethanol/pentanol mixture.

EXAMPLE 6

Catalyst (C) Preparation

The catalyst preparation was repeated in the conditions specified in Example 4 except that to the activated support 1 ml of a 1:1:1 equimolar mixture of ethanol, pentanol and hexanol was added instead of the ethanol/pentanol mixture.

EXAMPLE 7

2500 g of highly purified n-heptane was introduced into a 10 l stainless steel polymerization vessel provided with agitation. After a thorough purging of the vessel with nitrogen, 100 ml of triethylaluminium (10% solution in heptane), and 3 ml of catalyst B was introduced. The temperature was set to 80° C. and after 1 hour of stirring, 2000 mg of hydrogen were added. Further a simultaneous supply of 1000 g of ethylene at a constant flow of 4 g/hour, and of a 2000 g of a 1:10 molar mixture of 1-pentene and 1-hexene at a constant flow of 8 g/hour was started.

In a next step the polymerization vessel was depressurized and the catalyst decomposed with propanol. The resultant copolymer was then filtered and repeatedly washed with propanol, methanol and acetone. The terpolymer was dried in a vacuum oven at 70° C. for 24 hours. The yield of the terpolymer was 790 g.

To the dried terpolymer powder was added 0.02 weight % of tetrakis methylene (3,5-di-t-butyl-4-hydroxy hydrocinnamate) methane, 0.09 weight % tetrakis(2,4-di-t-butylphenyl)-4,4'-diphenylenebisphosphonite, 0.01 weight % of 2.6-bis(1,1-dimethylethyl)-4-(ethenyl)phenol, 0.005 weight % of dicumyl peroxide and 0.15 weight % of calcium stearate. After a thorough mixing the mixture was pelletized on a CTM extruder equipped with water bath and cutter with the extruder zones temperature of 210/240/240/240° C. and a screw speed of 10 rpm. From the pellets a film was blown according to the conditions described in Example 1.

The composition of the terpolymer and the measured properties are presented in Table 2.

EXAMPLE 8

The terpolymerization was performed according to the conditions specified in Example 7, except the mixture of 1-pentene and 1-hexene added, having a composition of 1 molar part of 1-hexene to 1 molar part of 1-pentene. An amount of 3 ml of catalyst C was added and the reaction temperature was set to 80° C. The amount of hydrogen was 2500 mg. The yield of the terpolymer was 1010 g. The composition of the terpolymer and the measured properties are presented in Table 2.

EXAMPLE 9

The terpolymerization was performed according to the conditions specified in Example 7, except the mixture of 1-pentene and 1-hexene added, having a composition of 1 part of 1-hexene to 10 part of 1-pentene. An amount of 3 ml of catalyst A was added and the reaction temperature was set to 80° C. The amount of hydrogen was 1800 mg. The yield of the terpolymer was 780 g. The composition of the terpolymer and the measured properties are presented in table 2.

TABLE 2

| Example | Total monomer content % | 1-pentene/ 1-hexene ratio molar | MFI g/10 min | Density g/cm³ | Impact strength g | Tensile strength at break MD g/μm | TD |
|---|---|---|---|---|---|---|---|
| 7 | 2,7 | 1/10 | 1,9 | 0,9194 | 85 | 26,6 | 25,3 |
| 8 | 3,2 | 1,7/1,5 | 3,7 | 0,9183 | 108 | 29,2 | 28,3 |
| 9 | 3,4 | 10/1 | 0,9 | 0,9173 | 132 | 30,5 | 27,7 |

EXAMPLE 10

The terpolymerization was performed according to the conditions specified in Example 7, except for the amount of the mixture of 1-pentene and 1-hexene added which was 800 g, having a composition of 5 parts of 1-hexene to 1 part of 1-pentene. An amount of 3 ml of catalyst B was added and the reaction temperature was set to 75° C. The amount of hydrogen was 1500 mg. The yield of the terpolymer was 830 g. The composition of the terpolymer and the measured properties are presented in Table 3.

EXAMPLE 11

The terpolymerization was performed according to the conditions specified in Example 7, except for the amount of the mixture of 1-pentene and 1-hexene added which was 1200 g, having a composition of 1 part of 1-hexene to 1 part of 1-pentene. An amount of 1.5 ml of catalyst B and 1.5 ml of catalyst A was added and the reaction temperature was set to 85° C. The amount of hydrogen was 1500 mg. The yield of the terpolymer was 930 g. The composition of the terpolymer and the measured properties are presented in Table 3.

EXAMPLE 12

The terpolymerization was performed according to the conditions specified in Example 7, except for the amount of the mixture of 1-pentene and 1-hexene added which was 1500 g, having a composition of 1 part of 1-hexene to 1 part of 1-pentene. An amount of 3 ml of catalyst C was added and the reaction temperature was set to 85° C. The amount of hydrogen was 1500 mg. The yield of the terpolymer was 960 g. The composition of the terpolymer and the measured properties are presented in Table 3.

EXAMPLE 13

The terpolymerization was performed according to the conditions specified in Example 7, except for the amount of the mixture of 1-pentene and 1-hexene added which was 400 g, having a composition of 1 part of 1-hexene to 3 part of 1-pentene. An amount of 3 ml of catalyst C was added and the reaction temperature was set to 85° C. The amount of hydrogen was 1500 mg. The yield of the terpolymer was 980 g. The composition of the terpolymer and the measured properties are presented in Table 3.

TABLE 3

| Example | Total monomer content % | 1-pentene/ 1-hexene ratio molar | MFI g/10 min | Density g/cm³ | Impact strength g | Tensile strength at yield MD MPa | TD |
|---|---|---|---|---|---|---|---|
| 10 | 0,5 | 1/4 | 0,65 | 0,9455 | 55 | 18,6 | 17,9 |
| 11 | 0,93 | 1/1 | 0,44 | 0,9377 | 85 | 17,9 | 17,4 |
| 12 | 1,00 | 1/1 | 0,5 | 0,9370 | 85 | 16,7 | 14,7 |
| 13 | 0,3 | 1/2 | 0,3 | 0,9488 | 45 | 18,9 | 18,5 |

EXAMPLE 14

The terpolymerization was performed according to the conditions specified in Example 7, except the amount of the mixture of 1-pentene and 1-hexene added which was 800 g, having a composition of 1 part of 1-hexene to 3 parts of 1-pentene. An amount of 3 ml of catalyst C was added and the reaction temperature was set to 85° C. The amount of hydrogen was 3000 mg. The yield of the terpolymer was 990 g. The composition of the terpolymer and the measured properties are presented in Table 4.

EXAMPLE 15

The terpolymerization was performed according to the conditions specified in Example 7, except the amount of the mixture of 1-pentene and 1-hexene added which was 700 g, having a composition of 2 parts of 1-hexene to 1 part of 1-pentene. An amount of 3 ml of catalyst C was added and the reaction temperature was set to 85° C. The amount of hydrogen was 3000 mg. The yield of the terpolymer was 970 g. The composition of the terpolymer and the measured properties are presented in Table 4.

EXAMPLE 16

The terpolymerization was performed according to the conditions specified in Example 7, except the amount of the mixture of 1-pentene and 1-hexene added which was 1400 g, having a composition of 1 part of 1-hexene to 5 parts of 1-pentene. An amount of 3 ml of catalyst C was added and the reaction temperature was set to 85° C. The amount of hydrogen was 4000 mg. The yield of the terpolymer was 1000 g. The composition of the terpolymer and the measured properties are presented in Table 4.

EXAMPLE 17

The terpolymerization was performed according to the conditions specified in Example 7, except the amount of the mixture of 1-pentene and 1-hexene added which was 2500 g, having a composition of 5 parts of 1-hexene to 1 part of 1-pentene. An amount of 3 ml of catalyst C was added and the reaction temperature was set to 85° C. The amount of hydrogen was 4000 mg. The yield of the terpolymer was 1015 g. The composition of the terpolymer and the measured properties are presented in Table 4.

TABLE 4

| Example | Total monomer content % | 1-pentene/ 1-hexene ratio molar | MFI g/10 min | Density g/cm³ | Impact strength g | Tensile strength at yield MPa |
|---|---|---|---|---|---|---|
| 14 | 0,8 | 3/1 | 10 | 0,9400 | 5,1 | 18,6 |
| 15 | 0,8 | 3/5 | 12 | 0,9395 | 6,4 | 17,7 |
| 16 | 1,65 | 10/1 | 14 | 0,9283 | 15,44 | 12,7 |
| 17 | 3,1 | 1/5 | 29 | 0,9183 | 29,0 | 10,39 |

EXAMPLE 18

100 grams of the dry terpolymer obtained according to Example 16 before stabilization were added 0.02 weight % of tetrakis methylene (3,5-di-t-butyl-4-hydroxy hydrocinnamate) methane, 0.09 weight % tetrakis(2,4-di-t-butylphenyl)-4,4'-diphenylenebisphosphonite, 0.01 weight % of 2,6-bis(1,1-dimethylethyl)-4-(ethenyl)phenol, 0.005 weight % of dicumyl peroxide and 0.15 weight % of calcium stearate. After a thorough mixing the mixture was pelletized on a CTM extruder equipped with water bath and cutter with the extruder zones temperature of 210/240/240/240° C. and a screw speed of 10 rpm.

The pellets obtained as described above were subjected to multiple extrusions (190° C. and 60 min$^{-1}$) on a Brabender Plasti-corder single screw extruder (4 zones). The results are presented in Table 5.

EXAMPLE 19

100 grams of the dry terpolymer obtained according to Example 16 before stabilization were added 0.02 weight % of Octadecyl-3-(3',5'-di-t-butyl-4'-hydroxyphenyl) propionate, 0.09 weight % tetrakis(2,4-di-t-butylphenyl)-4,4'-diphenylenebisphosphonite, 0.01 weight % of 2,6-bis(1,1-dimethylethyl)-4-(ethenyl)phenol, 0.005 weight % of dicumyl peroxide and 0.15 weight % of calcium stearate. After a thorough mixing the mixture was pelletized on a CTM extruder equipped with water bath and cutter with the extruder zones temperature of 210/240/240/240° C. and a screw speed of 10 rpm.

The pellets obtained as described above were subjected to multiple extrusions (190° C. and 60 min$^{-1}$) on a Brabender Plasti-corder single screw extruder (4 zones). The results are presented in Table 5.

EXAMPLE 20

100 grams of the dry terpolymer obtained according to Example 16 before stabilization were added 0.02 weight % of Octadecyl-3-(3',5'-di-t-butyl-4'-hydroxyphenyl) propionate, 0.16 weight tetrakis(2,4-di-t-butylphenyl)-4,4-diphenylenebisphosphonite, 0.02 weight 9 of 2,6-bis(1,1-dimethylethyl)-4-(ethenyl)phenol, 0.01 weight % of dicumyl peroxide and 0.25 weight % of calcium stearate. After a thorough mixing the mixture was pelletized on a CTM extruder equipped with water bath and cutter with the extruder zones temperature of 210/240/240/240° C. and a screw speed of 10 rpm.

The pellets obtained as described above were subjected to multiple extrusions (190° C. and 60 min$^{-1}$) on a Brabender Plasti-corder single screw extruder (4 zones). The results are presented in Table 5.

What is claimed is:

1. A terpolymer which comprises a polymerization product obtained by polymerizing ethylene, 1-pentene and 1-hexene and which, when it is bottom blown into a film having a thickness of 30 microns on a 31.77 mm extruder with 220° C. melt temperature using a 2:1 blow ratio, complies with the following requisites:
   (a) a melt flow index, as measured according to ASTM D 1238, of 0.01 to 100 g/10 minutes;
   (b) a density, as measured according to ASTM D 1505, of 0.890 to 0.950 g/cm$^3$;
   (c) an impact strength, as measured according to ASTM D 1709, of greater than 60 g;
   (d) a tear strength, as measured according to ASTM D 1922, of greater than 3.0 g/μm in the machine direction (MD) and greater than 12 g/μm in the transverse direction (TD); and
   (e) contains units derived from 1-pentene and 1-hexene between 0.1 and 10 molar % as determined by $^{13}$C NMR (samples dissolved in 1,2dichlorobenzene).

2. A terpolymer which comprises a polymerization product obtained by polymerizing ethylene, 1-pentene and 1-hexene and which, when it is bottom blown into a film having a thickness of 30 microns on a 31.77 mm extruder with 220° C. melt temperature using a 2:1 blow ratio, complies with the following requisites:
   (a) a melt flow index, as measured according to ASTM D 1238, of 0.01 to 100 g/10 minutes;
   (b) a density, as measured according to ASTM D 1505, of 0.890 to 0.950 g/cm$^3$;
   (c) an impact strength, as measured according to ASTM D 1709, of greater than 50 g;
   (d) a tensile strength at break, as measured according to ASTM D 882, of greater than 25 MPa in the machine direction (MD) and greater than 25 MPa in the transverse direction (TD); and
   (e) contains units derived from 1-pentene and 1-hexene between 0.1 and 10 molar % as determined by $^{13}$C NMR (samples dissolved in 1,2dichlorobenzene).

3. A terpolymer which comprises a polymerization product obtained by polymerizing ethylene, 1-pentene and 1-hexene and which, when it is bottom blown into a film having a thickness of 30 microns on a 31.77 mm extruder with 220° C. melt temperature using a 2:1 blow ratio, complies with the following requisites:
   (a) a melt flow index, as measured according to ASTM D 1238, of 0.01 to 100 g/10 minutes;
   (b) a density, as measured according to ASTM D 1505, of 0.890 to 0.950 g/cm$^3$;
   (c) an impact strength, as measured according to ASTM D 1709, of greater than 40 g;
   (d) a tensile strength at yield, as measured according to ASTM D 882, of greater than 15 MPa in the machine direction (MD) and greater than 14 MPa in the transverse direction (TD); and
   (e) contains units derived from 1-pentene and 1-hexene between 0.1 and 10 molar % as determined by $^{13}$C NMR (samples dissolved in 1,2dichlorobenzene).

4. A terpolymer which comprises a polymerization product obtained by polymerizing ethylene, 1-pentene and 1-hexene and which, when it is injection moulded according to ASTM D 647, complies with the following requisites:
   (a) a melt flow index, as measured according to ASTM D 1238, of 0.01 to 100 g/10 minutes;
   (b) a density, as measured according to ASTM D 1505, of 0.890 to 0.950 g/cm$^3$;
   (c) an Izod notched impact strength, as measured according to ASTM D 256, of between 5 and 60 kJ/m$^2$;
   (d) a tensile strength at yield, as measured according to ASTM 638 M, of between 10 MPa and 25 MPa; and
   (e) contains units derived from 1-pentene and 1-hexene between 0.1 and 10 molar % as determined by $^{13}$C NMR (samples dissolved in 1,2dichlorobenzene).

5. A process for producing a polymer, which process comprises reacting at least ethylene, 1-pentene and 1-hexene in at least one reaction zone, while maintaining the reaction zone at a pressure between atmospheric pressure and 60 kg/cm$_2$, and at a temperature between 30° C. and 120° C., in the presence of a catalyst system comprising a titanium-based Ziegler-Natta catalyst obtained by
   (i) adding dibutyl ether under inert conditions to a suspension of anhydrous magnesium chloride in an inert saturated hydrocarbon liquid, with the molar ratio of anhydrous magnesium chloride to dibutyl ether being between 0.3:1 and 3:1, and stirring the resultant mixture for a period of 30 minutes to 10 hours at room temperature;
   (ii) adding triethylaluminium dropwise to the suspension, with the molar ratio of triethylaluminium to anhydrous magnesium chloride being between 1:1 and 6:1, to form an activated support-containing slurry;
   (iii) adding to the activated support-containing slurry a three component alcohol mixture consisting of ethanol, hexanol and pentanol, with the molar ratio of the alcohol mixture to the initial magnesium chloride being between 0.4:1 and 4:1;
   (iv) stirring the alcohol/activated support mixture for between 1 and 10 hours; and
   (v) adding titanium chloride to the alcohol/activated support mixture such that the molar ratio of titanium chloride to magnesium chloride initially used is between 2:1 and 20:1, to form a magnesium chloride supported titanium catalyst, and, as a cocatalyst, an aluminium compound, thereby to produce a polymerized product.

6. A process according to claim 5, wherein the reaction or polymerization is carried out in a slurry phase and in a substantially oxygen and water free state, using an inert saturated hydrocarbon as a slurrying agent.

7. A process according to claim 5, wherein the cocatalyst is an organo aluminium compound expressed by the formula Al R$_m$ X$_{3-m}$ wherein R is a hydrocarbon radical or component of 1 to 15 carbon atoms, X is a halogen atom, and m is a number represented by 0<m<3, with the atomic ratio of aluminium to titanium in the catalyst system being between 0.1:1 and 500:1.

8. A process according to claim 5, wherein the reaction is effected in a batch fashion, with the 1-pentene and 1-hexene being added simultaneously to the reaction zone at the start of the reaction, with the ethylene being added continuously during the course of the reaction, and with no product being removed during the course of the reaction.

9. A process according to claim 5, wherein the reaction is effected in a batch fashion, with the 1-pentene and 1-hexene being added to the reaction zone simultaneously with the ethylene and with no product being removed during the course of the reaction.

10. A process according to claim 5, wherein the reaction is effected in a batch fashion, and either 1-pentene or 1-hexene being added to the reaction zone at the start of the reaction, ethylene being added continuously during the reaction, the monomer which was not added at the beginning of the reaction then being supplied, and with no product being removed during the course of the reaction.

11. A process according to claim 5, wherein the reaction is effected in a continuous manner with the ethylene being added continuously and 1-pentene and 1-hexene being added during the course of the reaction, and with the product being removed continuously from the reaction vessel.

12. A process according to claim 5, wherein the molecular weight of the terpolymer is regulated by adding hydrogen to the reaction zone.

13. A process according to claim 5, wherein the density of the terpolymer is regulated by the total content of 1-hexene and 1-pentene.

14. A process for producing a polymer, which process comprises reacting at least ethylene, 1-pentene and 1-hexene in at least one reaction zone, while maintaining the reaction zone at a pressure between atmospheric pressure and 60 kg/cm$^2$ and at a temperature between 30° C. and 120° C., in the presence of a catalyst system, to produce a polymerized product having a polyethyelene chain, with the catalyst system comprising a titanium based Ziegler-Natta catalyst, and, as a co-catalyst, an aluminium compound, with the catalyst having the ability to incorporate simultaneously about the same level of 1-pentene and 1-hexene in the polyethylene chain.

15. A process according to claim 14, wherein the reaction or polymerization is carried out in a slurry phase and in a substantially oxygen and water free state using an inert saturated hydrocarbon as a slurrying agent.

16. A process according to claim 15, wherein the Ziegler-Natta catalyst is that obtained by
(i) adding dibutyl ether under inert conditions to a suspension of anhydrous magnesium chloride in an inert saturated hydrocarbon liquid, with the molar ratio of anhydrous magnesium chloride to dibutyl ether being between 0.3:1 and 3:1, and stirring the resultant mixture for a period of 30 minutes to 10 hours at room temperature;
(ii) adding triethylaluminium dropwise to the suspension, with the molar ratio of triethylaluminium to anhydrous magnesium chloride being between 1:1 and 6:1, to form an activated support-containing slurry;
(iii) adding to the activated support-containing slurry a three component alcohol mixture consisting of ethanol, hexanol and pentanol, with the molar ratio of the alcohol mixture to the initial magnesium chloride being between 0.4:1 and 4:1;
(iv) stirring the alcohol/activated support mixture for between 1 and 10 hours; and
(v) adding titanium chloride to the alcohol/activated support mixture such that the molar ratio of titanium chloride to magnesium chloride initially used is between 2:1 and 20:1, to form a magnesium chloride supported titanium catalyst.

17. A process according to claim 15, wherein the cocatalyst is an organo aluminum compound expressed by the formula Al $R_m X_{3-m}$ wherein R is a hydrocarbon radical or component of 1 to 15 carbon atoms, X is a halogen atom, and m is a number represented by 0<m<3, with the atomic ratio of aluminium to titanium in the catalyst system being between 0.1:1 and 500:1.

18. A polymer composition, which comprises
(i) a terpolymer of ethylene, 1-pentene and 1-hexene;
(ii) a phenolic stabilizer component comprising a phenolic oxidant having molecular mass greater than 300, and selected from the group consisting of tetrakis methylene (3,5-di-t-butyl-4-hydroxy hydrocinnamate) methane; octadecyl-3-(3',5'-di-t-butyl-4'-hydroxyphenyl) propionate, 1,3,5-Tris(3'-5'-di-t-butyl-4'hydroxybenzyl)-s-triazine-2,4,6-(1H,3H,5H)trione, and 2,2'Thiodiethyl bis-(3,5-di-t-butyl-4-hydroxyphenyl)-propionate; and a monomeric phenolic stabilizer selected from the group consisting of 2,6-bis (1,1-dimethylethyl)-4-(1-methylethenyl)phenol, 2,6-bis(1,1-dimethylethyl)-4-(4-pentenyl)phenol, 2,6-bis (1,1-dimethylethyl)-4-(3,3-dimethyl-1-butenyl)phenol, and 2,6-bis(1,1-dimethylethyl)-4-(2-propenyl)phenol;
(iii) optionally, at least one organic phosphite stabilizer; and
(iv) a metal salt of a higher aliphatic acid.

19. A polymer composition according to claim 16, wherein the organic phosphite stabilizer is present, and is selected from the group consisting of tris(2,4-di-t-butylphenyl)phosphite, tris(4-nonylphenyl)phosphite, tetrakis(2,4-di-t-butylphenyl)-4,4'-diphenylenebisphosphonite, and bis(2,4-di-t-butylphenyl) pentaerythritoldiphosphite.

20. A polymer composition according to claim 18, wherein the metal salt of the higher aliphatic acid comprises an alkaline earth metal salt, an alkali metal salt, a zinc salt, cadmium salt or lead salt of stearic acid, lauric acid, capric acid, or palmitic acid.

21. A polymer composition according to claim 18, which comprises
(i) the ethylene/1-pentene/1-hexene terpolymer, in an amount of 100 parts by mass;
(ii) the phenolic stabilizer component in an amount of 0.0005 to 0.1 parts by mass; (iii) the higher aliphatic metal salt in an amount from 0.005 to 1 parts by mass.

22. A polymer composition according to claim 18, which comprises
(i) the ethylene/1-pentene/1-hexene terpolymer in an amount of 100 parts by mass;
(ii) the phenolic stabilizer component of 0.0005 to 0.1 parts by mass;
(iii) the organic phosphite stabilizer in an amount of 0.001 to 0.5 parts by mass; and
(iv) the higher aliphatic metal salt in an amount from 0.005 to 3 parts by mass.

* * * * *